Patented Apr. 13, 1943

2,316,169

UNITED STATES PATENT OFFICE 2,316,169

POLYVINYL HALIDE COMPOSITION

Archie B. Japs, Cuyahoga Falls, Ohio, assignor to The B. F. Goodrich Company, New York, N. Y., a corporation of New York No Drawing. Application March 1, 1941, Serial No. 381,385

4 Claims. (Cl. 260—23)

This invention relates to polyvinyl halide compositions and pertains specifically to organic stabilizers which impart to the compositions in which they are incorporated greater resistance to the influence of heat and light.

Many stabilizers have been used to prevent or retard the decomposition of plasticized polyvinyl halide compositions which occurs when the composition is heated to temperatures substantially above room temperature for a considerable length of time or when it is exposed to sunlight or to ultra-violet light for long periods. The organic stabilizers hitherto used all have certain undesirable characteristics. Triethanolamine, for example, although it provides satisfactory stabilization until exhausted, forms decomposition products which accelerate breakdown rather than retard it. The esters of unsaturated fatty acids, although quite effective as stabilizers, generally have undesirable odors or colors, and also tend to bleed from the stock.

I have now discovered that the partial esters of polyhydric alcohols with unsaturated fatty acids, such as ethylene glycol mono-oleate, glyceryl mono-oleate, ethylene glycol mono-ester of cottonseed oil fatty acid, glyceryl mono-ester of cottonseed oil fatty acid, the partial esters of such compounds as mannitol, inositol, sorbitol, glucose, propylene glycol, diethylene glycol, triethylene glycol, and other polyethylene glycols and "polymers" of glycerine, etc., with acids such as oleic, linoleic, ricinoleic, linolenic, or other unsaturated fatty acids containing more than ten carbon atoms are excellent stabilizers for plasticized compositions in which the polymer is made largely from vinyl chloride. The complete esters of the polyhydric alcohols are much inferior to the partial esters, while the alcohols and acids themselves possess very little stabilizing effect.

My new stabilizers not only have very little odor but they are colorless, non-bleeding when used in moderate proportions, and they possess the unique property of accelerating the inherent tendency of polyvinyl halide compositions which are slightly colored from heat treatment to bleach when exposed to sunlight or ultra-violet light. The decomposition products of these stabilizers which are left in the stock after the stabilizer is exhausted have no appreciable effect upon stability of the composition. Varying amounts of my stabilizers may be used, depending upon the plasticizer and pigments present in the composition; in general, about 0.5 to 3.0% by weight of the stabilizer, based on the plasticized composition, produces the best results.

As a specific example of the effectiveness of my new stabilizers I have prepared a composition containing 1.0% of the glycerol mono-ester of fatty acid. The effect of this stabilizer is equivalent to that of about 5.0% of butyl acetyl ricinoleate, one of the organic stabilizers commonly used hitherto, in a similar stock. Although various inorganic stabilizers, such as lead silicate, may have an equivalent stabilizing action when used in the same amount, the immiscibility of the inorganic material with the rest of the composition usually produces a cloudy or opaque stock which is unsatisfactory for many purposes.

The stabilizers of this invention may be added to the composition at any time before, during, or after plasticization of the polymer, although it is preferred to add them before heat processing the composition. They may conveniently be added by dissolving in the plasticizer before the addition of the latter to the polymer, for example. Although my new stabilizers have an appreciable plasticizing effect upon the composition, they cannot be used alone as plasticizers, and in the small amounts (0.5 to 3.0%) in which I prefer to use them their effect upon the physical properties of the composition other than its resistance to heat and light is negligible.

The polymers with which my stabilizers are effective are any of those composed largely of polyvinyl halide, such as alpha, beta, or gamma polyvinyl chloride, polyvinyl bromide, or copolymers of vinyl chloride with minor proportions of vinyl esters such as vinyl acetate or vinyl cyanide, or of vinylidene chloride.

Although my stabilizers are effective in compositions incorporating any of the ordinary plasticizers, the most satisfactory results are obtained with those plasticizers which are completely organic in nature, such as dibutyl phthalate, dioctyl phthalate, butyl phthalyl butyl glycollate, and the like. Pigments, fillers, softeners, etc., which are commonly used in the rubber or plastic industries may be incorporated in my stabilized compositions without destroying the stabilizing effect.

Although I have herein disclosed specific examples of my invention, I do not intend to limit myself solely thereto, but only to the spirit and scope of the appended claims.

I claim:

1. A heat and light-stable composition comprising a polymer in which the predominant constituent is vinyl chloride and a partial ester of a polyhydric alcohol which, except for the oxygen of the hydroxyl groups, consists solely of carbon and hydrogen with an unsaturated fatty acid containing more than ten carbon atoms, the hydroxyl groups of the alcohol which are not esterified with the fatty acid remaining unreacted.

2. A heat- and light-stable gamma polyvinyl chloride composition containing a partial ester of a polyhydric alcohol which, except for the oxygen of the hydroxyl groups, consists solely of carbon and hydrogen with an unsaturated fatty acid containing more than ten carbon atoms, the hydroxyl groups of the alcohol which are not esterified with the fatty acid remaining unreacted.

3. A heat- and light-stable composition comprising a glyceryl mono-ester of cottonseed oil fatty acid, the hydroxyl groups of the alcohol which are not esterified with the fatty acid remaining unreacted, and a polymer made largely from vinyl chloride.

4. A heat- and light-stable gamma polyvinyl chloride composition containing a glyceryl mono-ester of cottonseed oil fatty acid, the hydroxyl groups of the alcohol which are not esterified with the fatty acid remaining unreacted.

ARCHIE B. JAPS.